(12) United States Patent
Li et al.

(10) Patent No.: US 12,030,073 B2
(45) Date of Patent: Jul. 9, 2024

(54) SYSTEM AND METHOD FOR REAL-TIME MONITORING OF ABOVE-GROUND HEIGHT OF BOOM BASED ON MULTI-SOURCE INFORMATION FUSION

(71) Applicant: Jiangsu University, Jiangsu (CN)

(72) Inventors: Jinyang Li, Jiangsu (CN); Yunfei Chen, Jiangsu (CN)

(73) Assignee: Jiangsu University, Jiangsu (CN)

( * ) Notice: Subject to any disclaimer, the term of this patent is extended or adjusted under 35 U.S.C. 154(b) by 95 days.

(21) Appl. No.: 17/630,511

(22) PCT Filed: Apr. 13, 2021

(86) PCT No.: PCT/CN2021/086754
§ 371 (c)(1),
(2) Date: Jan. 27, 2022

(87) PCT Pub. No.: WO2022/174510
PCT Pub. Date: Aug. 25, 2022

(65) Prior Publication Data
US 2023/0158531 A1    May 25, 2023

(30) Foreign Application Priority Data
Feb. 22, 2021  (CN) .......................... 202110195969.9

(51) Int. Cl.
*B05B 12/12* (2006.01)
*A01M 7/00* (2006.01)
(Continued)

(52) U.S. Cl.
CPC ......... *B05B 12/124* (2013.01); *A01M 7/0057* (2013.01); *A01M 7/0089* (2013.01); *B05B 15/68* (2018.02); *G01S 15/08* (2013.01)

(58) Field of Classification Search
CPC . A01M 7/0057; A01M 7/0089; B05B 12/124; G01S 15/08
See application file for complete search history.

(56) References Cited

U.S. PATENT DOCUMENTS

2019/0357520 A1   11/2019   Redden et al.
2020/0045953 A1*   2/2020   Serrat ................. A01M 7/0089

FOREIGN PATENT DOCUMENTS

CN    102091682    6/2011
CN    104663637    6/2015
(Continued)

OTHER PUBLICATIONS

"International Search Report (Form PCT/ISA/210) of PCT/CN2021/086754," mailed on Oct. 28, 2021, pp. 1-4.
(Continued)

*Primary Examiner* — Tuongminh N Pham
(74) *Attorney, Agent, or Firm* — JCIPRNET (57) ABSTRACT

The present invention provides a system and method for real-time monitoring of an above-ground height of a boom based on multi-source information fusion. The system includes a boom, an information acquisition unit, and a control unit. The method includes: step 1: establishing a relationship between an above-ground height s of the boom and an output current y of a pull-wire cylinder displacement sensor; step 2: calibrating ultrasonic ranging sensors; step 3: acquiring above-ground heights of the boom; step 4: performing anti-interference processing on the acquired height data; step 5: calculating an above-ground height $H_0$ of the boom by multi-source data fusion; step 6: calculating a distance $H_{canno}$ between the boom and a crop canopy; step 7: acquiring an inclination angle $\theta_b$ of the boom; and step 8: calculating heights $H_{end}$ of two ends of the boom relative to ground.

5 Claims, 6 Drawing Sheets

(51) Int. Cl.
  *B05B 15/68* (2018.01)
  *G01S 15/08* (2006.01)

(56) References Cited

FOREIGN PATENT DOCUMENTS

| CN | 108489432 | 9/2018 |
|----|-----------|--------|
| CN | 108507769 | 9/2018 |
| EP | 1444894   | 8/2004 |

OTHER PUBLICATIONS

"Written Opinion of the International Searching Authority (Form PCT/ISA/237) of PCT/CN2021/086754," mailed on Oct. 28, 2021, pp. 1-4.
Wang, Songlin ; et al., "Design and Experiments on Boom Height Adjusting System," Journal of Agricultural Mechanization Research, Issue 8, Aug. 2014, pp. 1-5.
Aitazaz A. Farooque ; et al., "Performance evaluation of multiple ground based sensors mounted on a commercial wild blueberry harvester to sense plant height, fruit yield and topographic features in real-time," Computers and Electronics in Agriculture, vol. 91, Feb. 2013, pp. 135-144.
Pan, Fochu ; et al., "Design and Experiments on Boom Height Automatic Adjusting System," Journal of Agricultural Mechanization Research, Issue 11, Nov. 2017, pp. 1-5.
Martin Hammerle ; et al., "Direct derivation of maize plant and crop height from low-cost time-of-flight camera measurements," Plant Methods, vol. 12, Article No. 50, Nov. 2016, pp. 1-13.
Lei Zhang ; et al., "A LIDAR-based crop height measurement system for Miscanthus giganteus," Computers and Electronics in Agriculture, vol. 85, Jul. 2012, pp. 70-76.
Wei, Xinhua ; et al., "Online Control System of Spray Boom Height and Balance," Transactions of the Chinese Society for Agricultural Machinery, vol. 46, Issue 8, Aug. 2015, pp. 66-71.
Tadatoshi Satow ; et al., "Control of Spraying Height with Ultrasonic Sensor for Boom Sprayer (Part 1), " Journal of the Japanese Society of Agricultural Machinery, 1992, vol. 54, No. 2, pp. 31-39.

* cited by examiner

SYSTEM AND METHOD FOR REAL-TIME MONITORING OF ABOVE-GROUND HEIGHT OF BOOM BASED ON MULTI-SOURCE INFORMATION FUSION

CROSS-REFERENCE TO RELATED APPLICATION

This application is a 371 of international application of PCT application serial no. PCT/CN2021/086754, filed on Apr. 13, 2021, which claims the priority benefit of China application no. 202110195969.9, filed on Feb. 22, 2021. The entirety of each of the above mentioned patent applications is hereby incorporated by reference herein and made a part of this specification.

TECHNICAL FIELD

The present invention provides a system and method for real-time monitoring of an above-ground height of a boom based on multi-source information fusion, and belongs to the field of intelligent agricultural equipment.

BACKGROUND

Existing boom sprayers on the market in China are mainly 6-12 meters. On the one hand, the limited spraying width leads to low spray efficiency. On the other hand, when operating in a certain working area, the sprayer needs to travel back and forth many times in the field, which may damage a large area of crops. With the development of rapid land rotation and large-scale planting in China, boom sprayers with a spraying width of 24 m or more have appeared on the market. However, new problems are brought about by such boom sprayers with a large spraying width. When the sprayer is operating in the field, the boom shakes and tilts due to the uneven ground. For sprayers with a large spraying width, a small angle of inclination of the boom may cause the end of the boom to touch the ground, which may cause the boom to break or bend, and may also damage the crops. In actual operation, in order to improve the uniformity of droplet deposition and prevent drift, the boom needs to be parallel to and at a certain height above the crop canopy. Therefore, in order to improve the spraying quality and avoid the damage of the boom, it is necessary to control the height of the boom relative to the crop stably, accurately and dynamically. The dynamic monitoring of the height of the boom relative to the crop is the premise and the key to realize the stable and precise control of the height.

In the prior art, Patent 1 (Application No. 201510079697.0) discloses an automatic adjusting device and method for boom balance and height. This device adopts an ultrasonic sensor ranging module to measure the above-ground height of the boom. Since the ground is relatively flat, the above-ground height of the boom is easy to measure. However, for crop fields, because of the uneven growth of the crops in the field, the crop canopies are undulating, and the measurement precision is objectively affected by factors such as crop type, planting density, wind speed, and walking speed. Therefore, it is necessary to perform proper anti-interference processing on the acquired data in order to obtain valid height data. In addition, because the ultrasonic sensor is installed vertically on the boom beam, the sensor also tilts when the boom is tilted, and the vertical height of the boom relative to the ground cannot be obtained. Therefore, the automatic adjusting device and method for boom balance and height disclosed in Patent 1 cannot be used for real-time measurement of the height of the boom relative to the crop canopy. Patent 2 (Application No. 201010603644.1) discloses a self-balancing boom sprayer, which uses a controller to determine a balance status of a boom according to a horizontal angle of the boom detected by an inclination sensor during spraying operation, but cannot realize the real-time measurement of the above-ground height of the boom. The paper "Design and Experiments on Boom Height Automatic Adjusting System" (Wang Songlin et al., Journal of Agricultural Mechanization Research, 2014; 8: 161-164) designed a three-stage automatic height adjustment boom, in which three contact sensors respectively mounted on three sections (left section, middle section, and right section) of the boom are used to monitor the height of the boom relative to the ground in real time, and a controller is used to control a hydraulic cylinder to adjust the height of each section of the boom. Although this system can effectively adjust the attitude of the boom and maintain the height of the boom, the contact sensors used in this apparatus need to detect the height by contact with the crops, which may cause damage to the crops. On the other hand, if the sensor is right above the ground or low crops, a misjudgment may be made, reducing the reliability of the system. The paper "Performance evaluation of multiple ground based sensors mounted on a commercial wild blueberry harvester to sense plant height, fruit yield and topographic features in real-time" (Farooque A A, Chang Y K, Zaman Q U, et al, Computers & Electronics in Agriculture, 2013, 91:135-144) proposes a method of installing an ultrasonic sensor on a wild blueberry harvester to detect the blueberry plant height in real time. When the road in the blueberry field is flat, the blueberry plant height can be effectively detected, but when the ground is inclined at a certain angle, the plant height data obtained has a large error and cannot be used for effective detection of the plant height. The paper "Design and Experiments on Boom Height Automatic Adjusting System" (Pan Fuchu et al., Journal of Agricultural Mechanization Research, 2017; 11: 107-111) proposes a method of using an ultrasonic ranging sensor to acquire the distance between the crop canopy and the boom and additionally using an inclination sensor to obtain the inclination angle of the boom. Although the measurement result obtained by this method is better than that obtained by using ultrasonic measurement alone, the height of the boom relative to the canopy cannot be accurately obtained when the boom is tilted, and its filtering method is quite contingent and unstable in continuously obtaining 5 valid values through measurement. The paper "Direct derivation of maize plant and crop height from low-cost time-of-flight camera measurements" (Plant Methods, 2016) proposes a method of using a 3D camera to measure the plant height, which requires a long time for image data processing and has poor real-time performance. The paper "A LIDAR-based crop height measurement system for *Miscanthus giganteus*" (Computers & Electronics in Agriculture, 2012) proposes a method of using a lidar to measure the height of the boom relative to the crop canopy. The lidar used in this method is expensive and not cost-effective. The paper "Online Control System of Boom Height and Balance" (Transactions of the Chinese Society for Agricultural Machinery, 2015) proposes a method of using ultrasonic sensors to measure the heights of the two ends of the boom relative to the ground. However, this method is only applicable to boom sprayers equipped with row separators and broad-leaf low plants such as cotton, and are not suitable for linear-leaf plants such as rice and wheat as well as high-stalk crops. The paper "Control of spraying height with ultrasonic sensor for boom sprayer (Part 1)" (Journal of the Japanese Society of Agricultural Machinery, 1992, 54 (2): 31-39) studied the use of ultrasonic ranging sensors to monitor the height of the boom relative to the crop canopy. The results show that the sensor was able to detect the sensor to target height when the rate of leaf surface diameter to the height was larger than 0.05. The results obtained showed that the sensor detected the height within 6 cm bias error in the case of broad leaves such as potatoes, kidney beans and sugar beets. As for linear leaves such as wheat, the sensor could not detect the height correctly because of the decrease of reflected echo.

SUMMARY

To overcome the drawbacks in the prior art, an objective of the present invention is to provide a system and method for real-time monitoring of an above-ground height of a boom based on multi-source information fusion, to accurately and dynamically obtain the height of the boom relative to the ground during operation of a boom sprayer, providing a basis for the dynamic adjustment of the boom balance and the height of the boom relative to the crop canopy.

To solve the above technical problems, the following technical solutions are employed in the present invention.

The present invention provides a system for real-time monitoring of an above-ground height of a boom based on multi-source information fusion, including a boom (43), an information acquisition unit (44), and a control unit (45), wherein two ultrasonic ranging sensors are installed at positions on the boom (43) that are respectively exactly opposite to two rear tires of a tractor to which a boom sprayer is suspended; because the tires pass by ground when the sprayer is operating in the field, it is ensured that the ultrasonic ranging sensors are each capable of obtaining a distance between the boom and the ground that the corresponding tire passes by; and under action of the control unit (45), an above-ground height of the boom, a lifting cylinder displacement, a boom inclination angle, tractor body attitude information, and boom attitude information are effectively acquired, and after anti-interference data analysis and multi-source information fusion, a height of the boom relative to the ground or a crop canopy is calculated.

Further, the boom (43) is attached to a tractor (12) by a three-point suspension connecting rod (13) equipped on the tractor, and the boom (43) includes a left boom arm (2), a right boom arm (10), a boom lifting apparatus, a pesticide tank (14) configured to supply a pesticide to the boom, a boom arm profiling cylinder (3), connecting rods (7) between the boom and a boom integral lifting frame (6), a middle boom section (8), and two active balancing cylinders (9); the left boom arm (2), the right boom arm (10), and the middle boom section (8) are all truss structures made of square steel by welding, an upper right part of the left boom arm (2) is connected to one end of the boom arm profiling cylinder (3), and the other end of the boom arm profiling cylinder (3) is connected to an upper left part of the middle boom section (8); an upper left part of the right boom arm (10) is connected to an upper right part of the middle boom section (8) by the boom arm profiling cylinder (3); a lower right end of the left boom arm (2) is connected to a lower left end of the middle boom section (8) by a cylindrical hinge; a lower left end of the right boom arm (10) is connected to a lower right end of the middle boom section (8) by a cylindrical hinge; the boom lifting apparatus is configured to lift the left boom arm (2) and the right boom arm (10), and includes a boom lifting cylinder (4), the boom integral lifting frame (6), a steel wire rope (19), a fixed pulley (20), a connecting screw support frame (21), a connecting screw (22), a pull-wire cylinder displacement sensor (24), and a connecting piece (25) between the pull-wire cylinder displacement sensor and an inner support frame of the boom integral lifting frame; a bottom of the boom integral lifting cylinder (4) is vertically installed on the inner support frame (5) of the boom integral lifting frame by flange connection, an end part of a piston rod of the boom integral lifting cylinder (4) is processed into a V-shaped structure, a hole is formed on each of two ends of the V-shaped structure for installing a pin to install the fixed pulley (20), the fixed pulley (20) is provided with a pulley block support base, the connecting screw (22) and the connecting screw support frame (21) are fixed to the pulley block support base, the fixed pulley (20) is configured to be driven by the boom integral lifting cylinder (4) to perform an uplifting or lowering action, one end of the steel wire rope (19) on the fixed pulley (20) is fixed to the inner support frame (5) of the boom integral lifting frame, and the other end of the steel wire rope (19) is fixed on the boom integral lifting frame (6), so as to drive the boom (43) to move through the boom integral lifting cylinder (4); when the piston rod of the boom lifting cylinder (4) moves in a vertical direction, the boom is driven to move up and down to realize adjustment of the distance between the boom and the ground or the crop canopy; when the piston rod of the boom lifting cylinder (4) moves up and down, a pull wire length of the pull-wire cylinder displacement sensor (24) changes; the boom integral lifting frame (6) is made of square steel by welding, square guide rails configured to fit with the inner support frame (5) of the boom integral lifting frame are provided on left and right sides of the boom integral lifting frame (6) to limit the boom integral lifting frame (6) during a lifting process of the entire boom (43), one end of the boom integral lifting frame (6) is connected to the connecting rods (7), and the other end of the boom integral lifting frame (6) is fitted with the inner support frame of the boom integral lifting frame; the inner support frame (5) of the boom integral lifting frame is made of square steel by welding, a front end of the inner support frame (5) is connected to the three-point suspension connecting rod (13), the inner support frame (5) is configured to uplift or lower an overall height of a boom sprayer with a large spraying width, square guide rails configured to fit with the boom integral lifting frame (6) are provided on left and right sides of a rear end of the inner support frame (5) to limit a spatial position of an uplifting or lowering action of the boom (43), and the pesticide tank (14) for pesticide storage is installed on the inner support frame (5) between the three-point suspension connecting rod (13) and the boom integral lifting frame (6); and the two active balancing cylinders (9) are single-piston rod single-acting cylinders, the two active balancing cylinders (9) are installed substantially in a V shape, cylinder bottom ends of the two active balancing cylinders (9) are connected to a bottom of the middle boom section (8) by an earring ball hinge, an end of a piston rod of each of the two active balancing cylinders (9) is connected to the boom integral lifting frame (6) by a single earring hinge, and the earring ball hinge is configured to compensate for an angle variation during operation of the balancing cylinder.

Further, the information acquisition unit (44) includes an inclination sensor A (15), an inclination sensor B (41), an ultrasonic ranging sensor A (16), an ultrasonic ranging sensor B (40), a tractor body attitude sensor (17), a boom attitude sensor (18), and a pull-wire cylinder displacement sensor (24); one end of the pull-wire cylinder displacement sensor (24) is connected to the inner support frame (5) of the boom integral lifting frame by a connecting piece (25) between the pull-wire cylinder displacement sensor and the inner support frame of the boom integral lifting frame, and the other end of the pull-wire cylinder displacement sensor (24) is connected to the connecting screw support frame (21) by the connecting screw (22), so that a pull wire of the pull-wire cylinder displacement sensor (24) is kept parallel to an axis of the boom lifting cylinder (4); the boom attitude sensor (18) is fixed to a center position of the middle boom section (8) by a screw; the boom attitude sensor (18) is connected to an RS232 interface B (30) of a controller by an RS232 serial port equipped on the boom attitude sensor (18); the tractor body attitude sensor (17) is fixed to a center position of a tractor chassis (11) by a screw; the tractor body attitude sensor (17) is connected to an RS232 interface A (29) of the controller by an RS232 serial port equipped on the tractor body attitude sensor (17); the ultrasonic ranging sensor A (16) and the ultrasonic ranging sensor B (40) are formed with external threads, and upper and lower ends of the ultrasonic ranging sensor A (16) and the ultrasonic ranging sensor B (40) are each locked with a sensor installation height adjusting and locking nut; along a traveling direction of the sprayer, the ultrasonic ranging sensor A (16) and the ultrasonic ranging sensor B (40) are installed exactly behind left and right rear tires of the tractor respectively, so that waves emitted from the ultrasonic ranging sensors exactly reach tire indentations left on the ground by the left and right rear tires of the tractor, to ensure that the ultrasonic ranging sensor A (16) and the ultrasonic ranging sensor B (40) accurately acquires the distances of the boom relative to the ground; and the inclination sensor A (15) and the inclination sensor B (41) are respectively fixed to the left boom arm (2) and the right boom arm (10) by threads on the inclination sensor A (15) and the inclination sensor B (41), distances between the two inclination sensors and a center of the boom are equal, and the two inclination sensors are respectively connected to an RS232 interface C (31) and an RS232 interface D (4) of the controller by serial ports equipped on the two inclination sensors.

Further, the pull-wire cylinder displacement sensor (24) is a WXY31-1010-1024 sensor with an output of 4-20 mA, the boom attitude sensor (18) is an LPMS-IG1 RS232 metal-housing attitude sensor, the tractor body attitude sensor (17) is an LPMS-IG1 RS232 metal-housing attitude sensor, the ultrasonic ranging sensor A (16) and the ultrasonic ranging sensor B (40) are both UC2000-30GM-IUR2-V15 sensors from PEPPERL+FUCHS, and the inclination sensor A (15) and the inclination sensor B (41) are both VG525 dynamic inclination sensors.

Further, the control unit includes a controller (26), an ultrasonic ranging sensor A (16), an ultrasonic ranging sensor B (40), a secure digital (SD) card (34), an inclination sensor A (15), an inclination sensor B (41), a tractor body attitude sensor (17), a boom attitude sensor (18), a touch screen (37), a DC boost module (39), a DC voltage regulator module (38), and a 12 V DC power supply (36);

the controller (26) is an EMB8616I industrial control board, which integrates four RS232 serial ports, one RS485 serial port, eight 12-bit A/D conversion interfaces, two 12-bit D/A interfaces, and one SD card interface; the tractor body attitude sensor (17) is connected to the controller (26) by an RS232 interface A (29), the boom attitude sensor (18) is connected to the controller (26) by an RS232 interface B (30), the inclination sensor A (15) and the inclination sensor B (41) are respectively connected to the controller (26) by an RS232 interface C (31) and an RS232 interface D (42), the touch screen (37) is connected to the controller (26) by the RS485 interface (32), and the ultrasonic ranging sensor A (16) and the ultrasonic ranging sensor B (40) are respectively connected to an A/D conversion interface A (27) and an A/D conversion interface B (28) of the controller (26); the SD card (34) is directly inserted into an onboard SD card slot of the controller (26) through an SD card interface (33); the 12 V DC power supply (36) is a storage battery on the tractor, and is connected to the DC boost module (39) so that the DC boost module (39) converts a 12 V DC voltage into a 24 V DC voltage, to supply power to the ultrasonic ranging sensor A (16), the ultrasonic ranging sensor B (40), the tractor body attitude sensor (17), the boom attitude sensor (18), the inclination sensor A (15), the inclination sensor B (41), and the touch screen (37); and the 12 V DC power supply (36) is further connected to an input end of the DC voltage regulator module (38), and an output end of the DC voltage regulator module (38) is connected to the controller (26) by a power interface (35) to provide a stable DC 12 V power supply to the controller.

Further, the DC boost module (39) is an MDF150-12524 boost converter; the DC voltage regulator module (38) is an XW-0936-12 regulator; and the touch screen (37) is a DC80480F070-6111-0T resistive touch screen from Guangzhou Dacai Optoelectronics Technology Co., Ltd., the touch screen integrates an RS485 communication port and a TTL interface, and the touch screen (37) is connected to the RS485 interface (32) of the controller by an RS485 bus and is configured to display height data, a tractor body inclination angle, a boom inclination angle, a boom lifting cylinder displacement, and distances between ends of the boom and the ground that are acquired in real time, and to set a target value of the height of the boom relative to the crop canopy.

The present invention provides a method for real-time monitoring of an above-ground height of a boom based on multi-source information fusion, including the following steps:

step 1: establishing a relationship between the above-ground height s of the boom and an output current y of a pull-wire cylinder displacement sensor;

step 2: calibrating ultrasonic ranging sensors, wherein the ultrasonic ranging sensors used are configured for accurately measuring a distance in a range of 80-2000 mm and correspond to an output current of 4-20 mA, the 4-20 mA current is converted into a digital quantity of 0-4095 by an analog quantity acquisition module in a controller, and an actually measured height of the boom relative to a crop canopy is in a range of 200-2000 mm;

step 3: acquiring above-ground heights of the boom, including:

driving a boom sprayer into a field, unfolding the boom, starting a control unit, setting a sampling period to 100 ms via a touch screen, pressing a start button on the touch screen to acquire above-ground heights of the boom at different walking speeds for crop fields with different planting densities including wheat, rice, corn, and soybean fields, storing the above-ground heights in a secure digital (SD) card for subsequent anti-interference processing of the data, and at the same time, manually measuring above-ground heights of the boom and recording the measured values;

step 4: performing anti-interference processing on the acquired height data;

step 5: calculating an above-ground height $H_0$ of the boom by multi-source data fusion;

step 6: calculating a distance $H_{canno}$ between the boom and the crop canopy, wherein an average height $h_a$ of the crop canopy is obtained by manually measuring and averaging heights at a plurality of points, and the height of the boom relative to the crop canopy is $$H_{canno} = H_0 - h_a \quad (1)$$

step 7: acquiring an inclination angle $\theta_b$ of the boom:

$$\theta_{b1} = \sin^{-1}\left(\frac{h_1 - h_2}{D_L}\right) \quad (2)$$

$$\theta_{b2} = \theta_r - \theta_0 \quad (3)$$

wherein if $|\theta_{b1} - \theta_{b2}| < 0.5°$, then $\theta_b = \theta_{b1}$; otherwise, $\theta_b = \theta_{b2}$;

valid sampling values of an ultrasonic ranging sensor A and an ultrasonic ranging sensor B are respectively recorded as $h_1$ and $h_2$; $\theta_0$ is an value of a roll angle of a boom attitude sensor when the boom is in a balanced position; $\theta_r$ is a value of the roll angle of the boom attitude sensor when the boom is at any position; and $\theta_{b2}$ is the inclination angle of the boom obtained by the boom attitude sensor;

step 8: calculating heights $H_{end}$ of two ends of the boom relative to ground:

$$h_{end1} = H_0 + \Delta h_1 \pm L \sin \theta_b = H_0 + L \sin \beta \pm L \sin \theta_b \quad (4)$$

$$h_{end2} = H_0 + \Delta h_2 \mp L \sin \theta_b = H_0 + L \sin \alpha \mp L \sin \theta_b \quad (5)$$

wherein $\theta_b$ is the inclination angle of the boom, and has a negative value in a clockwise direction and a positive in a counterclockwise direction; $D_L$ is an installation distance between the two ultrasonic ranging sensors, and $\theta_T$ is an inclination angle of a tractor chassis to which the boom is attached; $h_{end1}$ and $h_{end2}$ are above-ground height values of a left end of the boom and a right end of the boom respectively; $\alpha$ and $\beta$ are respectively inclination angles of a right boom arm and a left boom arm when the boom is in the balanced position, which are obtained by an inclination sensor A and an inclination sensor B respectively; L is a length of the left boom arm and the right boom arm; and $\Delta h_1$ and $\Delta h_2$ are respectively displacement variations of the right boom arm and the left boom arm in a vertical direction when the inclination angles of the right boom arm and the left boom arm are respectively $\alpha$ and $\beta$.

Further, a specific process of step 1 includes: driving the sprayer on a level concrete road, unfolding the boom, leveling the boom, controlling a proportional solenoid valve connected to a boom lifting cylinder to lower the boom to a lowest position, and using the control unit to acquire a current value $A_1$ outputted by the pull-wire cylinder displacement sensor, at the same time, manually measuring and recording an above-ground height $s_1$ of the boom using a tape measure, controlling the proportional solenoid valve connected to the boom lifting cylinder to cause the boom to gradually rise under drive of the boom lifting cylinder, recording an above-ground height $s_2$ of the boom at this time and reading a current value $A_2$ outputted by the cylinder displacement sensor, and repeating this process until the boom reaches a highest position relative to the ground, so as to obtain a plurality of data pairs $\{S_n, y_n\}$ of the above-ground heights of the boom and the output currents of the cylinder displacement sensor during the boom uplift process; lowering the boom from the highest position to the lowest position gradually according to a certain step length, and obtaining a plurality of data pairs $\{S_n, y_n\}$ of above-ground heights of the boom and output currents of the pull-wire cylinder displacement sensor during the boom lowering process; establishing a relational expression between the above-ground height s of the boom and the output current y of the pull-wire cylinder displacement sensor by using a least square method or multiple regression method based on the data pairs obtained during the boom uplift and lowering processes; and then, changing the above-ground height of the boom, reading a corresponding current value outputted by the pull-wire cylinder displacement sensor, substituting the current value into the obtained relational expression between the above-ground height s of the boom and the output current y of the pull-wire cylinder displacement sensor to calculate an above-ground height $S_{measure}$ of the boom, manually measuring and recording an above-ground height value $S_{real}$ of the boom at this time, and if $|S_{measure} - S_{real}| \leq 0.5$ cm, which indicates that the established relational expression is correct, saving model coefficients for later use.

Further, a specific process of step 4 and step 5 includes:

filtering and analyzing the data acquired in step 3 by using limiting filtering and moving average filtering methods, and removing singular value data that is acquired due to interference by branches or leaves under the ultrasonic ranging sensors during operation of the sprayer and other interference, to obtain reliable and real valid data;

1) setting a valid height count N to 10; sequentially acquiring N ultrasonic sensor distance values $a_0, \ldots, a_{N-1}$ without interference by branches or leaves, and calculating an average value $A = (a_0 + a_1 \ldots + a_{N-1})/N$ as a valid distance value A;

2) acquiring a height of the ultrasonic ranging sensor as a current height C, and calculating a difference $D = C - A$; determining whether D is greater than $-10$ cm; if D is not greater than $-10$ cm, determining that the current sampling value is interfered by branches or leaves and is an invalid sampling value, discarding the current sampling value and going back to step 2) for sampling in a next sampling period; if D is greater than $-10$ cm, determining that the current sampling value is valid, and letting $N = N + 1$, $a_0 = a_1$, $a_1 = a_2, \ldots, a_{N-1} = C$;

3) determining whether the valid height count N reaches 10; if $N = 10$, performing step 4); and if $N < 10$, going back to step 2) to perform data acquisition in a next sampling period;

4) averaging the obtained N valid sampling values: $A = (a_0 + a_1 \ldots + a_{N-1})/N$, wherein A is a final valid sampling value of the ultrasonic ranging sensor, and resetting the counter N to prepare for subsequent data acquisition, i.e., letting $N = 0$;

5) for the ultrasonic ranging sensor A and the ultrasonic ranging sensor B, respectively recording the valid sampling values obtained through steps 1)-4) as $h_1$ and $h_2$; and 6) calculate an average value of $h_1$ and $h_2$: $h_0 = (h_1 + h_2)/2$; comparing the average value with the above-ground height of the boom obtained by the pull-wire cylinder displacement sensor; if $|h_0 - s| \leq 1$ cm, using the $h_0$ value as an above-ground height value of the boom; otherwise, discarding the $h_0$ value obtained in the current acquisition, and using the s value as the above-ground height value of the boom.

The present invention has the following beneficial effects.

(1) In the present invention, to overcome the drawbacks in the prior art that the distance between the boom and the crop canopy cannot be accurately measured using ultrasonic ranging sensors and the distance between the boom and the ground cannot be accurately measured in the presence of crops with dense canopies, two ultrasonic ranging sensors are installed at positions on the boom that are respectively exactly opposite to two rear tires of a tractor to which a boom sprayer is suspended; because the tires pass by ground when the sprayer is operating in the field, it is ensured that the ultrasonic ranging sensors are each capable of obtaining a distance between the boom and the ground that the corresponding tire passes by; and under action of the control unit, an above-ground height of the boom, a lifting cylinder displacement, a boom inclination angle, tractor body attitude information, and boom attitude information are effectively acquired, and after anti-interference data analysis and multi-source information fusion, a height of the boom relative to the ground or a crop canopy is accurately calculated. In this way, the accurate monitoring of the height of the boom relative to the ground in the presence of crops with dense canopies and linear leaves is realized, and the technical bottleneck that the boom needs to be equipped with row separators in order to accurately measure the height of the boom relative to the ground in the presence of crops with dense canopies is broke, laying a technical foundation for the dynamic adjustment of boom balance and height.

(2) The system and method for real-time monitoring of an above-ground height of a boom based on multi-source information fusion have a wide scope of application and can be easily installed on an existing boom sprayer by bolts.

In the figures: 1—crop; 2—left boom arm; 3—boom arm profiling cylinder; 4—boom lifting cylinder; 5—inner support frame of boom integral lifting frame; 6—boom integral lifting frame; 7—connecting rod; 8—middle boom section; 9—active balancing cylinder; 10—right boom arm; 11—tractor chassis; 12—tractor; 13—three-point suspension connecting rod; 14—pesticide tank; 15—inclination sensor A; 16—ultrasonic ranging sensor A; 17—tractor body attitude sensor; 18—boom attitude sensor; a—installation position of inclination sensor A on left boom arm; b—installation position of ultrasonic ranging sensor A on middle boom section; c—installation position of ultrasonic ranging sensor B on middle boom section; d—installation position of inclination sensor B on right boom arm; e—installation position of boom attitude sensor on middle boom section; f—installation position of tractor body attitude sensor; g—installation position of pull-wire cylinder displacement sensor; 19—steel wire rope; 20—fixed pulley; 21—connecting screw support frame; 22—connecting screw; 23—pull-wire cylinder displacement sensor connector; 24—pull-wire cylinder displacement sensor; 25—connecting piece between pull-wire cylinder displacement sensor and inner support frame of boom integral lifting frame; 26—controller; 27—A/D conversion interface A; 28—A/D conversion interface B; 29—RS232 interface A; 30—RS232 interface B; 31—RS232 interface C; 32—RS485 interface; 33—SD card interface; 34—SD card; 35—power interface; 36—12 V DC power supply; 37—touch screen; 38—DC regulator module; 39—DC boost module; 40—ultrasonic ranging sensor B; 41—inclination sensor B; 42—RS232 interface D; 43—boom; 44—information acquisition unit; 45—control unit.

DETAILED DESCRIPTION OF THE EMBODIMENTS

The embodiments of the present invention will be described in detail below with reference to the accompanying drawings.

Figure 1:
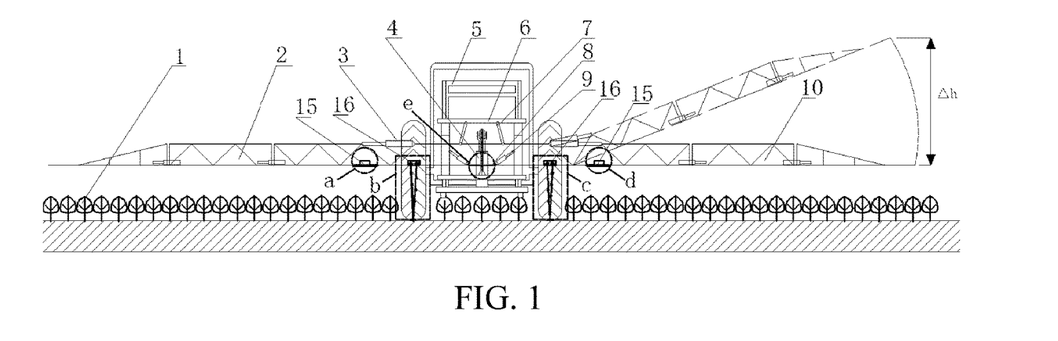
FIG. 1 is a front view of an overall structure of a boom sprayer.
Figure 2:
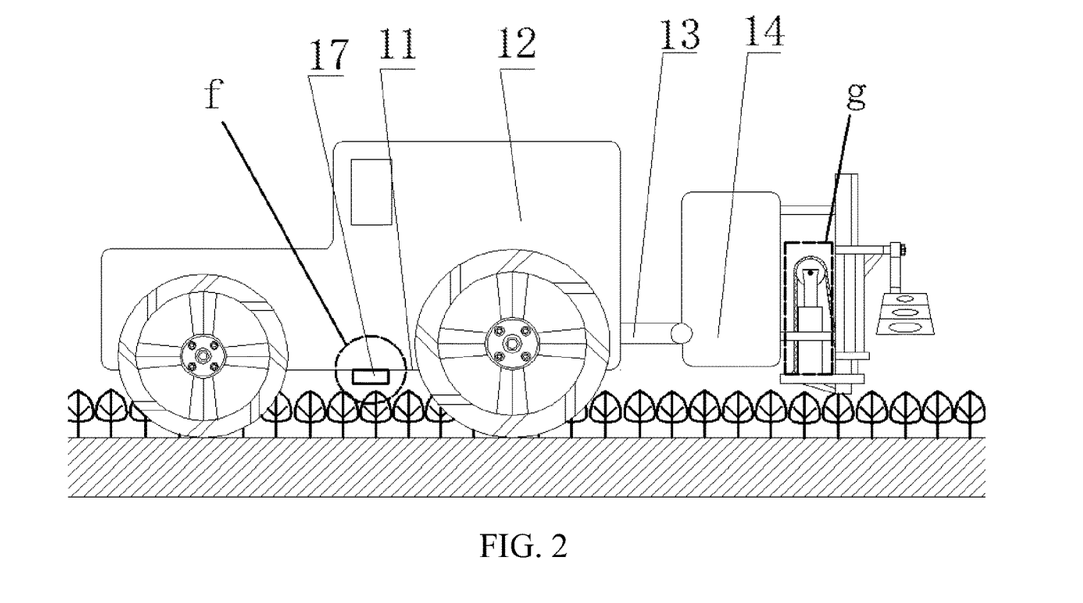
FIG. 2 is a left view of an overall structure of a boom sprayer.
Figure 3:
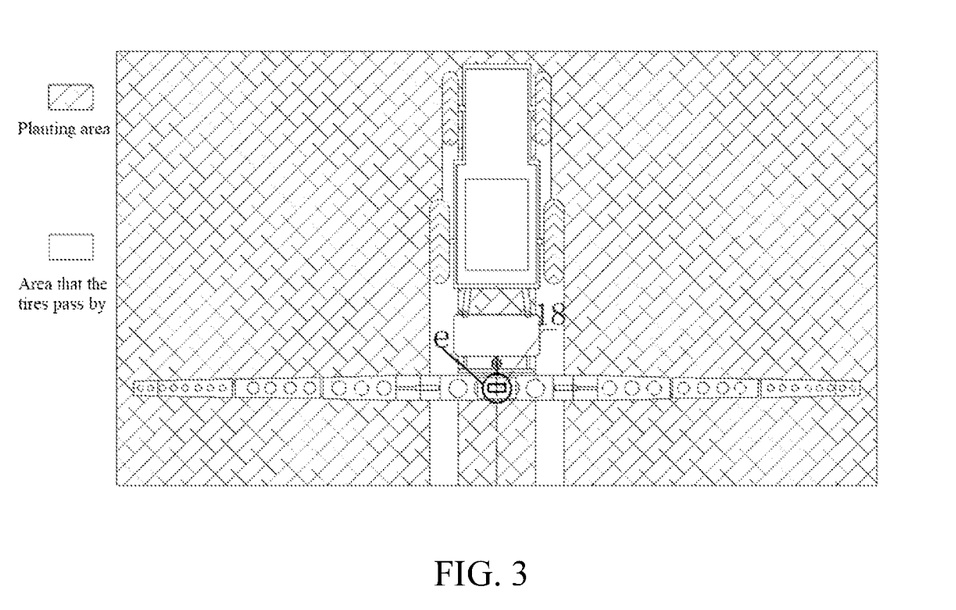
FIG. 3 is a top view of an overall structure of a boom sprayer.

As shown in FIG. 1, FIG. 2, and FIG. 3, the present invention provides a system for real-time monitoring of an above-ground height of a boom based on multi-source information fusion, including a boom 43, an information acquisition unit 44, and a control unit 45.

The boom 43 mainly includes a left boom arm 2, a boom arm profiling cylinder 3, a boom lifting cylinder 4, a pesticide tank 14, an inner support frame 5 of an boom integral lifting frame, the boom integral lifting frame 6, connecting rods 7 between the boom and the boom integral lifting frame, a middle boom section 8, two active balancing cylinders 9, a right boom arm 10, and a boom lifting apparatus. The boom 43 is attached to a tractor 12 by a three-point suspension connecting rod 13 equipped on the tractor.

The left boom arm 2, the right boom arm 10, and the middle boom section 8 are all truss structures made of 40×40 square steel by welding, an upper right part of the left boom arm 2 is connected to one end of the boom arm profiling cylinder 3, and the other end of the boom arm profiling cylinder 3 is connected to an upper left part of the middle boom section 8. An upper left part of the right boom arm 10 is connected to an upper right part of the middle boom section 8 by the boom arm profiling cylinder 3. A lower right end of the left boom arm 2 is connected to a lower left end of the middle boom section 8 by a cylindrical hinge. A lower left end of the right boom arm 10 is connected to a lower right end of the middle boom section 8 by a cylindrical hinge.

The boom arm profiling cylinder 3 is a single-piston rod double-acting cylinder having a rod diameter of 45 mm, a cylinder diameter of 57 mm, and a stroke of 600 mm. A piston rod portion of the boom arm profiling cylinder 3 is connected to the left boom arm 2 and the right boom arm 10 by an earring ball hinge. A cylinder bottom end of the boom arm profiling cylinder 3 is connected to the middle boom section 8 by a single earring. The connection manner using the earring ball hinge can bear the rotation of the left boom arm 2 and the right boom arm 10 during the profiling lifting or lowering process and the slight swing of the left boom arm 2 and the right boom arm 10 following the back and forth movement of the tractor body during the working process.

The boom lifting apparatus is configured to lift the left boom arm 2 and the right boom arm 10, and includes steel wire rope 19, a fixed pulley 20, a connecting screw support frame 21, a connecting screw 22, a pull-wire cylinder displacement sensor 24, and a connecting piece 25 between the pull-wire cylinder displacement sensor and the inner support frame of the boom integral lifting frame.

A bottom of the boom integral lifting cylinder 4 is vertically installed on the inner support frame 5 of the boom integral lifting frame by flange connection. An end part of a piston rod of the boom integral lifting cylinder 4 is processed into a V-shaped structure. A hole is formed on each of two ends of the V-shaped structure for installing a pin to install the fixed pulley 20. The fixed pulley 20 is configured to be driven by the boom integral lifting cylinder 4 to perform an uplifting or lowering action. One end of the steel wire rope 19 on the fixed pulley 20 is fixed to the inner support frame 5 of the boom integral lifting frame, and the other end of the steel wire rope 19 is fixed on the boom integral lifting frame 6, so as to drive the boom 43 to move through the boom integral lifting cylinder 4. When the piston rod of the boom lifting cylinder 4 moves in a vertical direction, the boom is driven to move up and down to realize adjustment of the distance between the boom and the ground or the crop canopy. When the piston rod of the boom lifting cylinder 4 moves up and down, a pull wire length of the pull-wire cylinder displacement sensor 24 changes.

The boom integral lifting frame 6 is made of square steel by welding, square guide rails configured to fit with the inner support frame 5 of the boom integral lifting frame are provided on left and right sides of the boom integral lifting frame 6 to limit the boom integral lifting frame 6 during a lifting process of the entire boom 43, one end of the boom integral lifting frame 6 is connected to the connecting rods 7, and the other end of the boom integral lifting frame 6 is fitted with the inner support frame 5 of the boom integral lifting frame.

The connecting rods 7 are each made by forging. The solid forging in the middle part is forged with a round hole at each of two ends for hinged connection with the boom 43 and the boom integral lifting frame 6. The installation method of the connecting rods 7 is symmetrical installation of two connecting rods in the shape of substantially an inverted V-shape. The connecting rods 7, the boom 43, and the boom integral lifting frame 6 are connected to form a trapezoidal connecting rod structure.

The inner support frame 5 of the boom integral lifting frame is made of square steel by welding. A front end of the inner support frame 5 is connected to the three-point suspension connecting rod 13. The inner support frame 5 is configured to uplift or lower an overall height of a boom sprayer with a large spraying width. Square guide rails configured to fit with the boom integral lifting frame 6 are provided on left and right sides of a rear end of the inner support frame 5 to limit a spatial position of an uplifting or lowering action of the boom 43. The pesticide tank 14 for pesticide storage is installed on the inner support frame 5 part between the three-point suspension connecting rod 13 and the boom integral lifting frame 6.

The two active balancing cylinders 9 are single-piston rod single-acting cylinders each having a rod diameter of 50 mm, a cylinder diameter of 63 mm, and a stroke of 250 mm. The two active balancing cylinders 9 are installed substantially in a V shape. Cylinder bottom ends of the two active balancing cylinders 9 are connected to a bottom of the middle boom section 8 by an earring ball hinge. An end of a piston rod of each of the two active balancing cylinders 9 is connected to the boom integral lifting frame 6 by a single earring hinge. The earring ball hinge is configured to compensate for an angle variation during operation of the balancing cylinder.

The information acquisition unit 44 includes an inclination sensor A 15, an inclination sensor B 41, an ultrasonic ranging sensor A 16, an ultrasonic ranging sensor B 40, a tractor body attitude sensor 17, a boom attitude sensor 18, and a pull-wire cylinder displacement sensor 24.

The pull-wire cylinder displacement sensor 24 is a WXY31-1010-1024 sensor (Taizhou Jiaojiang Xiyu Electronics Factory), with an output of 4-20 mA. One end of the pull-wire cylinder displacement sensor 24 is connected to the inner support frame 5 of the boom integral lifting frame by a connecting piece 25 between the pull-wire cylinder displacement sensor and the inner support frame of the boom integral lifting frame, and the other end of the pull-wire cylinder displacement sensor 24 is connected to the connecting screw support frame 21 by the connecting screw 22, so that a pull wire of the pull-wire cylinder displacement sensor 24 is kept parallel to an axis of the boom lifting cylinder 4.

Figure 5:
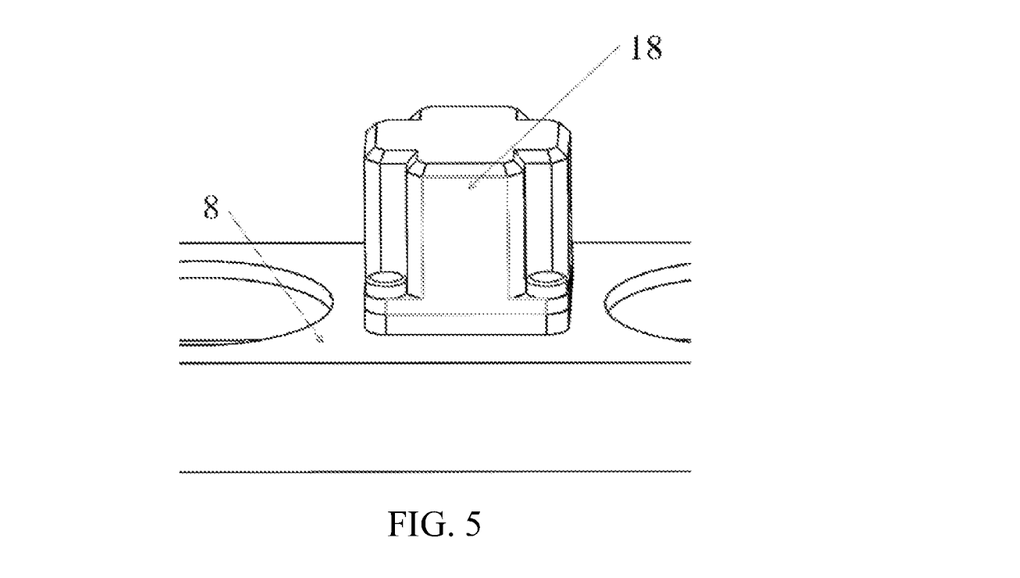
FIG. 5 is a schematic view showing installation of a boom attitude sensor at a position e on the middle boom section.

As shown in FIG. 5, the boom attitude sensor 18 is an LPMS-IG1 RS232 metal-housing attitude sensor, and is fixed at a middle-section boom attitude sensor installation position e, i.e., a center position of the middle boom section 8, by a screw. The boom attitude sensor 18 is connected to an RS232 interface B 30 of a controller by an RS232 serial port equipped on the boom attitude sensor 18.

Figure 6:
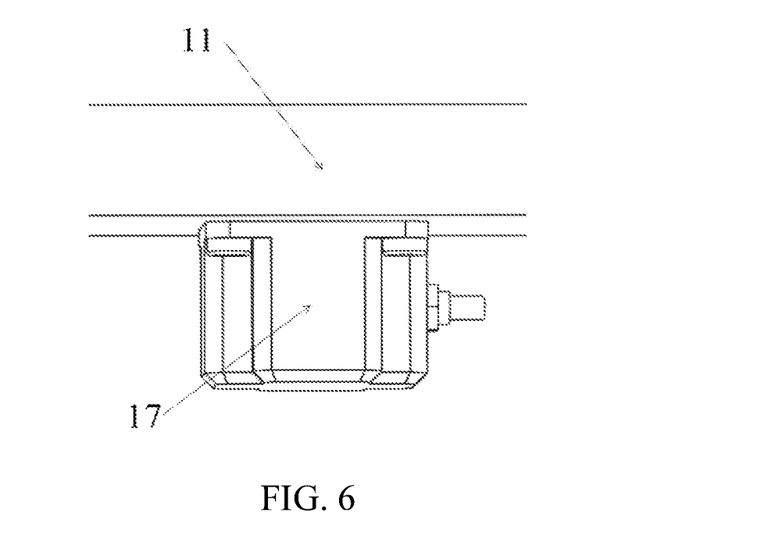
FIG. 6 is a schematic view showing installation of a tractor body attitude sensor at a position f.

As shown in FIG. 6, the tractor body attitude sensor 17 is an LPMS-IG1 RS232 metal-housing attitude sensor, and is fixed at a tractor body attitude sensor installation position f, i.e., a center position of a chassis 11 of the tractor, by a screw; The tractor body attitude sensor 17 is connected to an RS232 interface A 29 of the controller by an RS232 serial port equipped on the tractor body attitude sensor 17.

The ultrasonic ranging sensor A 16 and the ultrasonic ranging sensor B 40 are both UC2000-30GM-IUR2-V15 sensors from PEPPERL+FUCHS. The sensors are formed with external threads. After the sensors are respectively perpendicularly passed through sensor installation holes having a diameter of 30 mm at a middle-boom-section ultrasonic ranging sensor installation position b and a middle-boom-section ultrasonic ranging sensor installation position c on the boom, upper and lower ends of the sensors are each locked with a sensor installation height adjusting and locking nut. Along a traveling direction of the sprayer, the ultrasonic ranging sensor A 16 and the ultrasonic ranging sensor B 40 are installed exactly behind left and right rear tires of the tractor respectively, so that waves emitted from the ultrasonic ranging sensors exactly reach tire indentations left on the ground by the left and right rear tires of the tractor to reduce the interference by branches and leaves, to ensure that the ultrasonic ranging sensor A 16 and the ultrasonic ranging sensor B 40 accurately acquires the distances of the boom relative to the ground.

Figure 4:
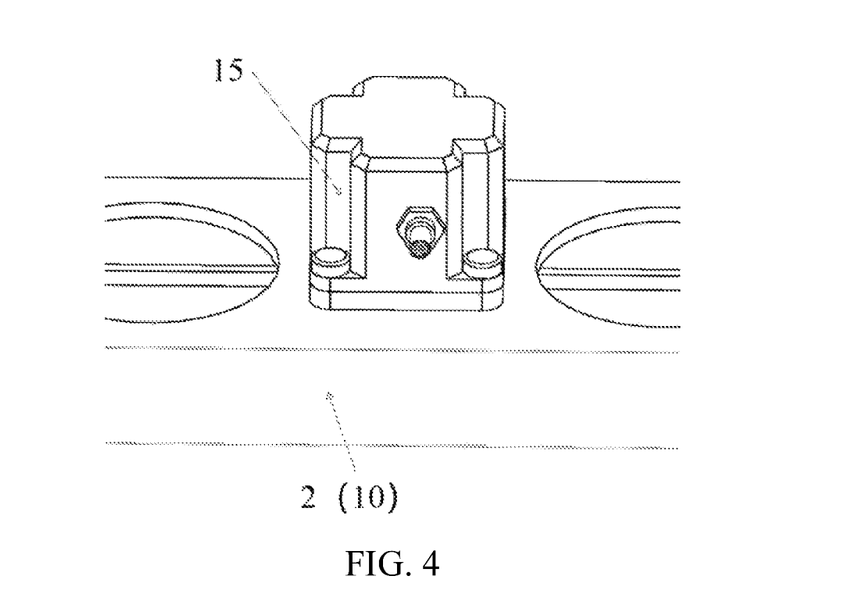
FIG. 4 is a schematic view showing installation of an inclination sensor.

As shown in FIG. 4, the inclination sensor A 15 and the inclination sensor B 41 are both VG525 dynamic inclination sensors (Wuxi Bewis Sensing Technology Co., Ltd.), and are respectively fixed at a left-boom-arm inclination sensor installation position a on the left boom arm 2 and a right-boom-arm inclination sensor installation position d on the right boom arm 10 by threads on the inclination sensor A 15 and the inclination sensor B 41, distances between the two inclination sensors 15 and a center of the boom are equal, and the two inclination sensors A 15 and B 41 are respectively connected to an RS232 interface C 31 and an RS232 interface D 42 of the controller by serial ports equipped on the two inclination sensors.

Figure 7:
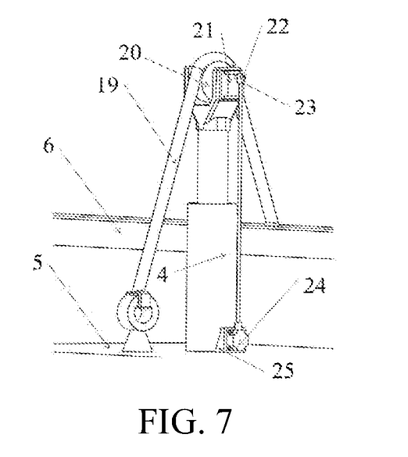
FIG. 7 is a schematic view showing installation of a boom lifting apparatus and a pull-wire cylinder displacement sensor.

As shown in FIG. 7, the boom lifting apparatus includes the boom lifting cylinder 4, the inner support frame 5 of the boom integral lifting frame 6, the boom integral lifting frame 6, the steel wire rope 19, the fixed pulley 20, the connecting screw support frame 21, the connecting screw 22, a pull-wire cylinder displacement sensor connector 23, the pull-wire cylinder displacement sensor 24, and the connecting piece 25 between the pull-wire cylinder displacement sensor and the inner support frame of the boom integral lifting frame.

The fixed pulley 20 is welded to an end of the piston rod of the boom lifting cylinder 4. The connecting screw support frame 21 is fixed to a pulley block support base. One end of the steel wire rope wound on the fixed pulley is fixed to the inner support frame 5 of the boom integral lifting frame by a hinge, and the other end of the steel wire rope is fixed to the boom integral lifting frame 6. When the piston rod of the boom lifting cylinder 4 moves in the vertical direction, the boom is driven to move up and down to realize adjustment of the distance between the boom and the ground or the crop canopy. When the piston rod of the boom lifting cylinder 4 moves up and down, the pull wire length of the pull-wire cylinder displacement sensor 24 changes.

Figure 8:
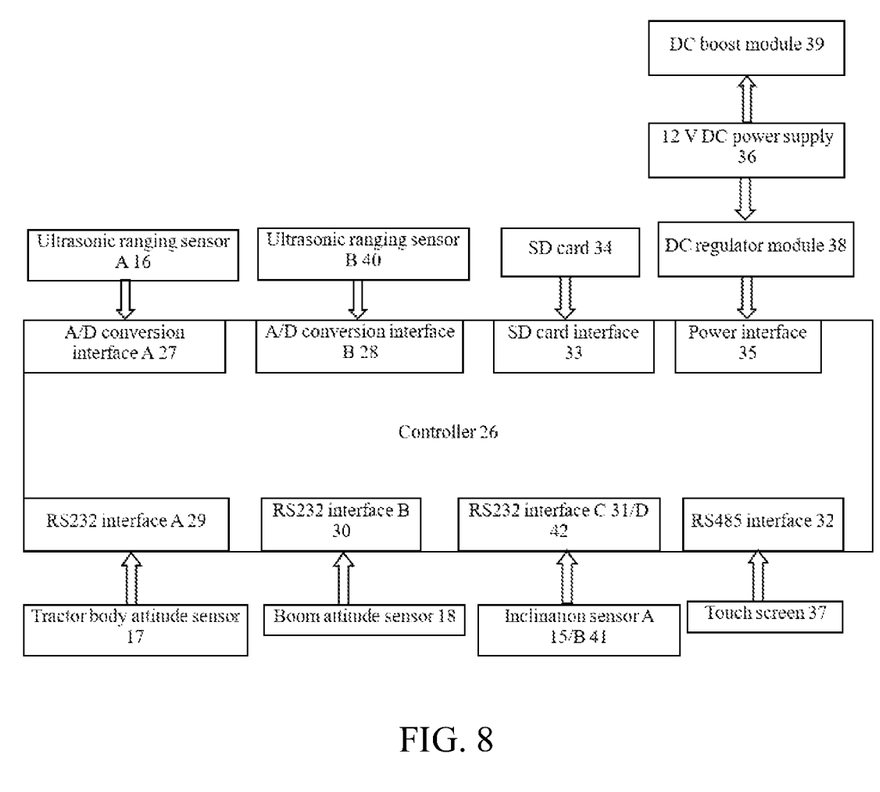
FIG. 8 is a schematic view of a control unit.

As shown in FIG. 8, the control unit includes a controller 26, an ultrasonic ranging sensor A 16, an ultrasonic ranging sensor B 40, an SD card 34, an inclination sensor A 15, an inclination sensor B 41, a tractor body attitude sensor 17, a boom attitude sensor 18, a touch screen 37, a DC boost module 39, a DC voltage regulator module 38, and a 12 V DC power supply 36.

The controller 26 is an EMB86161 industrial control board, which uses STM32F107VCT6 from STMicroelectronics as an MCU, and integrates four RS232 serial ports, one RS485 serial port, eight 12-bit A/D conversion interfaces, two 12-bit D/A interfaces, and one SD card interface.

The tractor body attitude sensor 17 is connected to the controller 26 by an RS232 interface A 29. The boom attitude sensor 18 is connected to the controller 26 by an RS232 interface B 30. The inclination sensor A 15 and the inclination sensor B 41 are respectively connected to the controller 26 by an RS232 interface C 31 and an RS232 interface D 42. The touch screen 37 is connected to the controller 26 by the RS485 interface 32. The ultrasonic ranging sensor A 16 and the ultrasonic ranging sensor B 38 are respectively connected to an A/D conversion interface A 27 and an A/D conversion interface B 28 of the controller 26. The SD card 34 is directly inserted into an onboard SD card slot of the controller 26 through an SD card interface 33.

The 12 V DC power supply 36 is a storage battery on the tractor, and is connected to the DC boost module 39 so that the DC boost module 39 converts a 12 V DC voltage into a 24 V DC voltage, to supply power to the ultrasonic ranging sensor A 16, the ultrasonic ranging sensor B 40, the tractor body attitude sensor 17, the boom attitude sensor 18, the inclination sensor A 15, the inclination sensor B 41, and the touch screen 37. The 12 V DC power supply 36 is further connected to an input end of the DC voltage regulator module 38, and an output end of the DC voltage regulator module 38 is connected to the controller 26 by a power interface 35 to provide a stable DC 12 V power supply to the controller.

The DC boost module 39 is an MDF150-12S24 boost converter.

The DC voltage regulator module 38 is an XW-0936-12 regulator.

The touch screen 37 is a DC80480F070-6111-0T resistive touch screen from Guangzhou Dacai Optoelectronics Technology Co., Ltd. The touch screen integrates an RS485 communication port and a TTL interface. The touch screen 37 is connected to the RS485 interface 32 of the controller by an RS485 bus and is configured to display height data, a tractor body inclination angle, a boom inclination angle, a boom lifting cylinder displacement, and distances between ends of the boom and the ground that are acquired in real time, and to set a target value of the height of the boom relative to the crop canopy.

The present invention provides a method for real-time monitoring of an above-ground height of a boom based on multi-source information fusion, including the following steps.

Step 1: A relationship between an above-ground height s of the boom and an output current y of a pull-wire cylinder displacement sensor is established.

The sprayer is driven on a level concrete road. The boom is unfolded and leveled. A proportional solenoid valve connected to a boom lifting cylinder is controlled to lower the boom to a lowest position. The control unit is used to acquire a current value $A_1$ outputted by the pull-wire cylinder displacement sensor. At the same time, an above-ground height $s_1$ of the boom is manually measured and recorded using a tape measure. The proportional solenoid valve connected to the boom lifting cylinder is controlled to cause the boom to gradually rise under drive of the boom lifting cylinder. An above-ground height $s_2$ of the boom at this time is recorded and a current value $A_2$ outputted by the cylinder displacement sensor is read. This process is repeated until the boom reaches a highest position relative to the ground, so as to obtain a plurality of data pairs $\{S_n, y_n\}$ of the above-ground heights of the boom and the output currents of the cylinder displacement sensor during the boom uplift process. The boom is lowered from the highest position to the lowest position gradually according to a certain step length, and a plurality of data pairs $\{S_n, y_n\}$ of above-ground heights of the boom and output currents of the pull-wire cylinder displacement sensor during the boom lowering process are obtained. A relational expression between the above-ground height s of the boom and the output current y of the pull-wire cylinder displacement sensor is established by using a least square method or multiple regression method based on the data pairs obtained during the boom uplift and lowering processes. Then, the above-ground height of the boom is changed, a corresponding current value outputted by the pull-wire cylinder displacement sensor is read, the current value is substituted into the obtained relational expression between the above-ground height s of the boom and the output current y of the pull-wire cylinder displacement sensor to calculate an above-ground height $S_{measure}$ of the boom, and an above-ground height value $S_{real}$ of the boom at this time is manually measured and recorded. If $|S_{measure} - S_{real}| \leq 0.5$ cm, which indicates that the established relational expression is correct, model coefficients are saved for later use.

Step 2: Ultrasonic ranging sensors are calibrated.

The ultrasonic ranging sensors used are configured for accurately measuring a distance in a range of 80-2000 mm and correspond to an output current of 4-20 mA. The 4-20 mA current is converted into a digital quantity of 0-4095 by an analog quantity acquisition module in a controller. An actually measured height of the boom relative to a crop canopy is in a range of 200-2000 mm. Therefore, in the present invention, only data in the range of 200-2000 mm is accurately calibrated.

Step 3: Above-ground heights of the boom are acquired.

A boom sprayer is driven into a field. The boom is unfolded. The control unit is started. A sampling period is set to 100 ms via a touch screen. A start button on the touch screen is pressed to acquire above-ground heights of the boom at different walking speeds for crop fields with different planting densities including wheat, rice, corn, and soybean fields. The above-ground heights are stored in an SD card for subsequent anti-interference processing of the data. At the same time, above-ground heights of the boom are manually measured and the measured values are recorded.

Step 4: Anti-interference processing is performed on the acquired height data.

Figure 10:
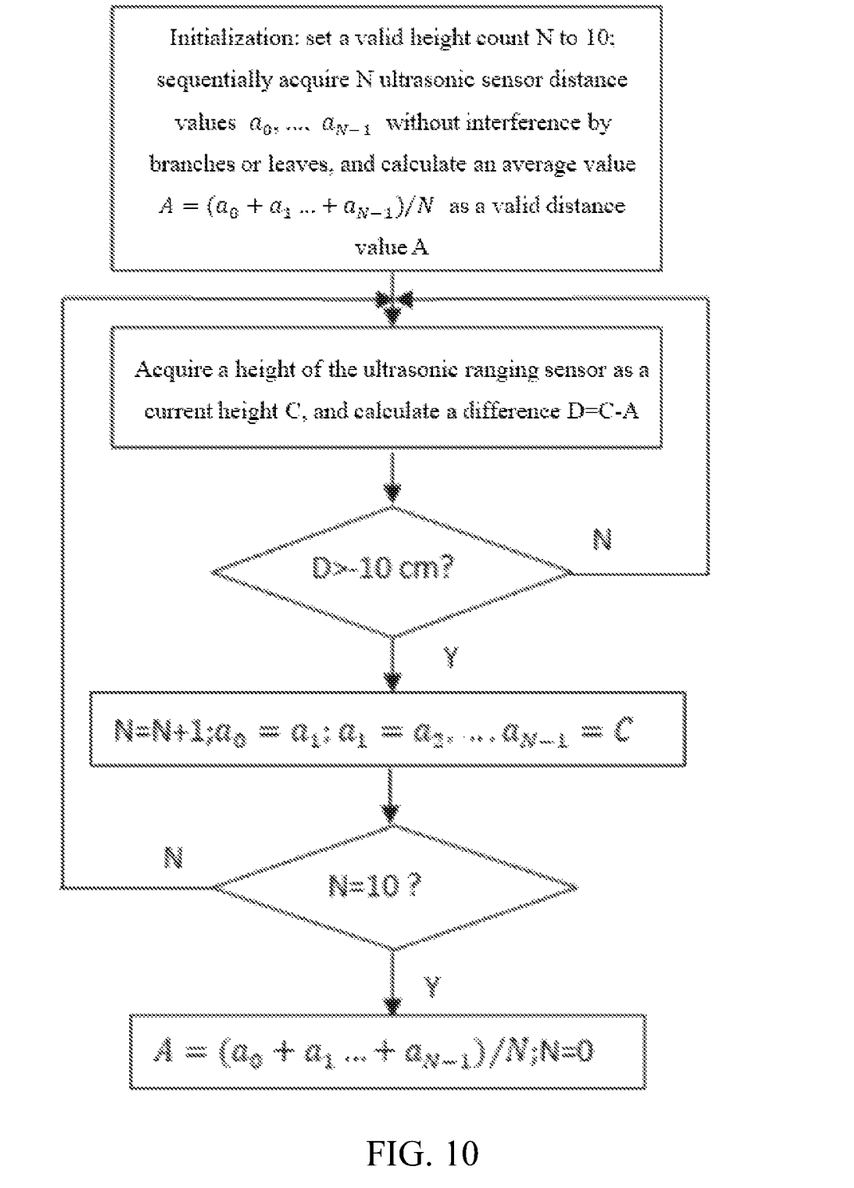
FIG. 10 is a flowchart of a filtering procedure for interference caused by branch or leaf occlusion.

As shown in FIG. 10, the data acquired in step 3 is filtered and analyzed by using limiting filtering and moving average filtering methods, and singular value data that is acquired due to interference by branches or leaves under the ultrasonic ranging sensors during operation of the sprayer and other interference is removed, to obtain reliable and real valid data.

(1) A valid height count N is set to 10. N ultrasonic sensor distance values $a_0, \ldots, a_{N-1}$ without interference by branches or leaves are sequentially acquired, and an average value $A=(a_0+a_1 \ldots +a_{N-1})/N$ is calculated as a valid distance value A.

(2) A height of the ultrasonic ranging sensor is acquired as a current height C, and a difference $D=C-A$ is calculated. It is determined whether D is greater than −10 cm. If D is not greater than −10 cm, it is determined that the current sampling value is interfered by branches or leaves and is an invalid sampling value, the current sampling value is discarded, and the process goes back to step (2) for sampling in a next sampling period. If D is greater than −10 cm, it is determined that the current sampling value is valid, and let $N=N+1$, $a_0=a_1$, $a_1=a_2, \ldots, a_{N-1}=C$;

(3) It is determined whether the valid height count N reaches 10. If N=10, step (4) is performed; if N<10, the process goes back to step (2) to perform data acquisition in a next sampling period.

(4) The obtained N valid sampling values are averaged: $A=(a_0+a_1 \ldots +a_{N-1})/N$, wherein A is a final valid sampling value of the ultrasonic ranging sensor. The counter N is reset to prepare for subsequent data acquisition, i.e., let N=0.

(5) For the ultrasonic ranging sensor A and the ultrasonic ranging sensor B, the valid sampling values obtained through steps (1)-(4) are respectively recorded as $h_1$ and $h_2$.

Step 5: An above-ground height $H_0$ of the boom is calculated by multi-source data fusion.

Figure 9:
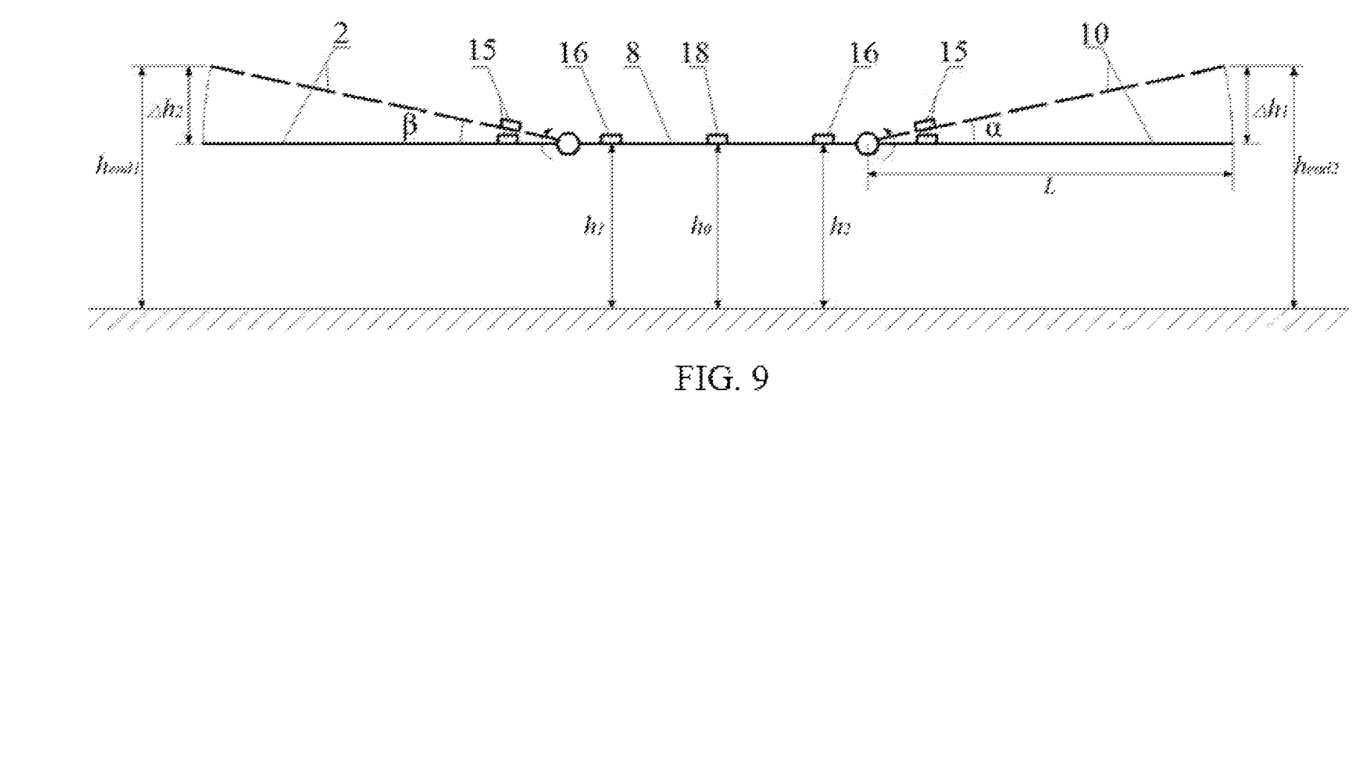
FIG. 9 is a schematic view showing measurement of an above-ground height of a boom based on multi-source information fusion.

As shown in FIG. 9, an average value of $h_1$ and $h_2$ is calculated: $h_0=(h_1+h_2)/2$; The average value is compared with the above-ground height of the boom obtained by the pull-wire cylinder displacement sensor. If $|h_0-s|\leq 1$ cm, the $h_0$ value is used as an above-ground height value of the boom; otherwise, the $h_0$ value obtained in the current acquisition is discarded, and the s value is used as the above-ground height value of the boom.

Step 6: A distance $H_{canno}$ between the boom and the crop canopy is calculated.

An average height $h_a$ of the crop canopy is obtained by manually measuring and averaging heights at a plurality of points, and the height of the boom relative to the crop canopy is $$H_{canno}=H_0-h_a \tag{1}$$

Step 7: An inclination angle $\theta_b$ of the boom is acquired:

$$\theta_{b1} = \sin^{-1}\left(\frac{h_1 - h_2}{D_L}\right) \tag{2}$$

$$\theta_{b2} = \theta_r - \theta_0 \tag{3}$$

If $|\theta_{b1}-\theta_{b2}|<0.5°$, then $\theta_b=\theta_{b1}$; otherwise, $\theta_b=\theta_{b2}$;

$\theta_0$ is a value of a roll angle of a boom attitude sensor when the boom is in a balanced position; $\theta_r$ is a value of the roll angle of the boom attitude sensor when the boom is at any position; and $\theta_{b2}$ is the inclination angle of the boom obtained by the boom attitude sensor.

Step 8: Heights $H_{end}$ of two ends of the boom relative to ground are calculated:

$$h_{end1}=H_0+\Delta h_1 \pm L \sin \theta_b = H_0 + L \sin \beta \pm L \sin \theta_b \tag{4}$$

$$h_{end2}=H_0+\Delta h_2 \mp L \sin \theta_b = H_0 + L \sin \alpha \mp L \sin \theta_b \tag{5}$$

wherein $\theta_b$ is the inclination angle of the boom, and has a negative value in a clockwise direction and a positive in a counterclockwise direction; $D_L$ is an installation distance between the two ultrasonic ranging sensors, and $\theta_T$ is an inclination angle of a tractor chassis to which the boom is attached; $h_{end1}$ and $h_{end2}$ are above-ground height values of a left end of the boom and a right end of the boom respectively; $\alpha$ and $\beta$ are respectively inclination angles of a right boom arm and a left boom arm when the boom is in the balanced position, which are obtained by an inclination sensor A and an inclination sensor B respectively; L is a length of the left boom arm and the right boom arm; and $\Delta h_1$ and $\Delta h_2$ are respectively displacement variations of the right boom arm and the left boom arm in a vertical direction when the inclination angles of the right boom arm and the left boom arm are respectively $\alpha$ and $\beta$.

The working process of the system and method for real-time monitoring of an above-ground height of a boom based on multi-source information fusion according to the present invention is as follows: Before the sprayer starts the spraying operation, the system for real-time monitoring of an above-ground height of a boom is started to perform a power-on self test. After the self test is passed, the touch screen 37 is used to set a target height of the boom relative to the ground, a height threshold, etc. Then under the action of the controller 26, the ultrasonic ranging sensor A 16 and the ultrasonic ranging sensor B 40 are used to dynamically acquire heights of the boom relative to the ground that the rear tires of the tractor pass by. The inclination sensor A 15, the inclination sensor B 41, the inclination sensor A 16, the tractor body attitude sensor 17, the boom attitude sensor 18, and the pull-wire cylinder displacement sensor 24 are respectively used to acquire an inclination angle of the left boom arm, an inclination angle of the right boom arm, a tractor body attitude, a boom attitude, and a displacement of the boom lifting cylinder. Through anti-interference processing of the acquired data and data fusion, actual heights of the two ends of the boom relative to the ground, an inclination angle of the boom and a distance $H_{canno}$ between the boom and the crop canopy are obtained, stored in the SD card 34, and displayed in real time on the touch screen 37.

What is claimed is:

1. A system for real-time monitoring of a height of a boom relative to a ground based on multi-source information fusion, comprising a boom, an information acquisition unit, and a control unit, wherein the information acquisition unit comprises an inclination sensor A, an inclination sensor B, an ultrasonic ranging sensor A, an ultrasonic ranging sensor B, a tractor body attitude sensor, a boom attitude sensor, and a pull-wire cylinder displacement sensor, wherein the control unit comprises a controller, the ultrasonic ranging sensor A, the ultrasonic ranging sensor B, a secure digital (SD) card, the inclination sensor A, the inclination sensor B, the tractor body attitude sensor, the boom attitude sensor, a touch screen, a DC boost module, a DC voltage regulator module, and a 12 V DC power supply, wherein the ultrasonic ranging sensor A and the ultrasonic ranging sensor B are installed at positions on the boom that are respectively opposite to two rear tires of a tractor to which a boom sprayer is suspended; because the tires pass by ground when the sprayer is operating in the field, it is ensured that the ultrasonic ranging sensor A and the ultrasonic ranging sensor B are each capable of obtaining a distance between the boom and the ground that the corresponding tire passes by; and under action of the control unit, the height of the boom relative to the ground, a lifting cylinder displacement, a boom inclination angle, tractor body attitude information, and boom attitude information are acquired, and after anti-interference data analysis and multi-source information fusion, the height of the boom relative to the ground or a crop canopy is calculated,     wherein the boom is attached to a tractor by a three-point suspension connecting rod equipped on the tractor, and the boom comprises a left boom arm, a right boom arm, a boom lifting apparatus, a pesticide tank configured to supply a pesticide to the boom, a boom arm profiling cylinder, connecting rods between the boom and a boom integral lifting frame, a middle boom section, and two active balancing cylinders;

the left boom arm, the right boom arm, and the middle boom section are all truss structures made of square steel by welding, an upper right part of the left boom arm is connected to one end of the boom arm profiling cylinder, and the other end of the boom arm profiling cylinder is connected to an upper left part of the middle boom section; an upper left part of the right boom arm is connected to an upper right part of the middle boom section by the boom arm profiling cylinder; a lower right end of the left boom arm is connected to a lower left end of the middle boom section by a cylindrical hinge; a lower left end of the right boom arm is connected to a lower right end of the middle boom section by a cylindrical hinge;

the boom lifting apparatus is configured to lift the left boom arm and the right boom arm, and comprises a boom lifting cylinder, the boom integral lifting frame, a steel wire rope, a fixed pulley, a connecting screw support frame, a connecting screw, a pull-wire cylinder displacement sensor, and a connecting piece between the pull-wire cylinder displacement sensor and an inner support frame of the boom integral lifting frame;

a bottom of the boom integral lifting cylinder is vertically installed on the inner support frame of the boom integral lifting frame by flange connection, an end part of a piston rod of the boom integral lifting cylinder is processed into a V-shaped structure, a hole is formed on each of two ends of the V-shaped structure for installing a pin to install the fixed pulley, the fixed pulley is provided with a pulley block support base, the connecting screw and the connecting screw support frame are fixed to the pulley block support base, the fixed pulley is configured to be driven by the boom integral lifting cylinder to perform an uplifting or lowering action, one end of the steel wire rope on the fixed pulley is fixed to the inner support frame of the boom integral lifting frame, and the other end of the steel wire rope is fixed on the boom integral lifting frame, so as to drive the boom to move through the boom integral lifting cylinder; when the piston rod of the boom lifting cylinder moves in a vertical direction, the boom is driven to move up and down to realize adjustment of the distance between the boom and the ground or the crop canopy; when the piston rod of the boom lifting cylinder moves up and down, a pull wire length of the pull-wire cylinder displacement sensor changes;

the boom integral lifting frame is made of square steel by welding, square guide rails configured to fit with the inner support frame of the boom integral lifting frame are provided on left and right sides of the boom integral lifting frame to limit the boom integral lifting frame during a lifting process of the entire boom, one end of the boom integral lifting frame is connected to the connecting rods, and the other end of the boom integral lifting frame is fitted with the inner support frame of the boom integral lifting frame;

the inner support frame of the boom integral lifting frame is made of square steel by welding, a front end of the inner support frame is connected to the three-point suspension connecting rod, the inner support frame is configured to uplift or lower an overall height of a boom sprayer with a spraying width, square guide rails configured to fit with the boom integral lifting frame are provided on left and right sides of a rear end of the inner support frame to limit a spatial position of an uplifting or lowering action of the boom, and the pesticide tank for pesticide storage is installed on the inner support frame between the three-point suspension connecting rod and the boom integral lifting frame; and     the two active balancing cylinders are single-piston rod single-acting cylinders, the two active balancing cylinders are installed substantially in a V shape, cylinder bottom ends of the two active balancing cylinders are connected to a bottom of the middle boom section by a hinge, an end of a piston rod of each of the two active balancing cylinders is connected to the boom integral lifting frame by the hinge, and the hinge is configured to compensate for an angle variation during operation of the balancing cylinder.

2. The system for real-time monitoring of the height of the boom relative to the ground based on the multi-source information fusion according to claim 1, wherein     one end of the pull-wire cylinder displacement sensor is connected to the inner support frame of the boom integral lifting frame by a connecting piece between the pull-wire cylinder displacement sensor and the inner support frame of the boom integral lifting frame, and the other end of the pull-wire cylinder displacement sensor is connected to the connecting screw support frame by the connecting screw, so that a pull wire of the pull-wire cylinder displacement sensor is kept parallel to an axis of the boom lifting cylinder;

the boom attitude sensor is fixed to a center position of the middle boom section by a screw; the boom attitude sensor is connected to an RS232 interface B of a controller by an RS232 serial port equipped on the boom attitude sensor;

the tractor body attitude sensor is fixed to a center position of a tractor chassis by a screw; the tractor body attitude sensor is connected to an RS232 interface A of the controller by an RS232 serial port equipped on the tractor body attitude sensor;

the ultrasonic ranging sensor A and the ultrasonic ranging sensor B are formed with external threads, and upper and lower ends of the ultrasonic ranging sensor A and the ultrasonic ranging sensor B are each locked with a sensor installation height adjusting and locking nut; along a traveling direction of the sprayer, the ultrasonic ranging sensor A and the ultrasonic ranging sensor B are installed exactly behind left and right rear tires of the tractor respectively, so that waves emitted from the ultrasonic ranging sensors exactly reach tire indentations left on the ground by the left and right rear tires of the tractor, to ensure that the ultrasonic ranging sensor A and the ultrasonic ranging sensor B acquires the distances of the boom relative to the ground; and the inclination sensor A and the inclination sensor B are respectively fixed to the left boom arm and the right boom arm by threads on the inclination sensor A and the inclination sensor B, distances between the two inclination sensors and a center of the boom are equal, and the two inclination sensors are respectively connected to an RS232 interface C and an RS232 interface D of the controller by serial ports equipped on the two inclination sensors.

3. The system for real-time monitoring of the height of the boom relative to the ground based on the multi-source information fusion according to claim 1, wherein the pull-wire cylinder displacement sensor is a WXY31-1010-1024 sensor with an output of 4-20 mA, the boom attitude sensor is an LPMS-IG1 RS232 metal-housing attitude sensor, the tractor body attitude sensor is an LPMS-IG1 RS232 metal-housing attitude sensor, the ultrasonic ranging sensor A and the ultrasonic ranging sensor B are both UC2000-30GM-IUR2-V15 sensors, and the inclination sensor A and the inclination sensor B are both VG525 dynamic inclination sensors.

4. The system for real-time monitoring of the height of the boom relative to the ground based on the multi-source information fusion according to claim 1, wherein the controller is an EMB86161 industrial control board, which integrates four RS232 serial ports, one RS485 serial port, eight 12-bit A/D conversion interfaces, two 12-bit D/A interfaces, and one SD card interface; the tractor body attitude sensor is connected to the controller by an RS232 interface A, the boom attitude sensor is connected to the controller by an RS232 interface B, the inclination sensor A and the inclination sensor B are respectively connected to the controller by an RS232 interface C and an RS232 interface D, the touch screen is connected to the controller by the RS485 interface, and the ultrasonic ranging sensor A and the ultrasonic ranging sensor B are respectively connected to an A/D conversion interface A and an A/D conversion interface B of the controller; the SD card is directly inserted into an onboard SD card slot of the controller through an SD card interface;

the 12 V DC power supply is a storage battery on the tractor, and is connected to the DC boost module so that the DC boost module converts a 12 V DC voltage into a 24 V DC voltage, to supply power to the ultrasonic ranging sensor A, the ultrasonic ranging sensor B, the tractor body attitude sensor, the boom attitude sensor, the inclination sensor A, the inclination sensor B, and the touch screen; and the 12 V DC power supply is further connected to an input end of the DC voltage regulator module, and an output end of the DC voltage regulator module is connected to the controller by a power interface to provide a stable DC 12 V power supply to the controller.

5. The system for real-time monitoring of the height of the boom relative to the ground based on the multi-source information fusion according to claim 4, wherein the DC boost module is an MDF150-12S24 boost converter; the DC voltage regulator module is an XW-0936-12 regulator; and the touch screen is a DC80480F070-6111-0T resistive touch screen, the touch screen integrates an RS485 communication port and a TTL interface, and the touch screen is connected to the RS485 interface of the controller by an RS485 bus and is configured to display height data, a tractor body inclination angle, a boom inclination angle, a boom lifting cylinder displacement, and distances between ends of the boom and the ground that are acquired in real time, and to set a target value of the height of the boom relative to the crop canopy.

* * * * *